June 14, 1927.

G. H. MALOTT 1,632,241

METHOD OF GROWING TOBACCO

Filed Dec. 9 1926

Inventor
George H. Malott
by Fetherstonhaugh & Co.
Att'ys.

Patented June 14, 1927.

1,632,241

UNITED STATES PATENT OFFICE.

GEORGE HENRY MALOTT, OF LEAMINGTON, ONTARIO, CANADA.

METHOD OF GROWING TOBACCO.

Application filed December 9, 1926. Serial No. 153,655.

My invention relates to improvements in methods of growing tobacco, and the object of the invention is to devise a method by which a plant will have a healthier growth and therefore the leaf grow to a larger size and of better color, and in which the laborious slow operation and stopping to remove the suckers from the plant and the expense incident thereto is dispensed with, and it consists of the steps hereinafter described.

In the drawing like characters of reference indicate corresponding parts in each figure.

1 is the stem of a plant provided with leaves 2 and a head 3 at the upper end of the stem 1 carrying the flowers and seed pods.

Figure 1:
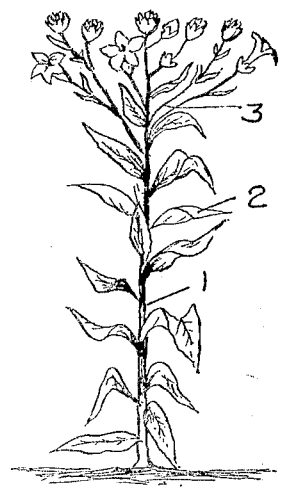
Fig. 1 is a view of a tobacco plant shown at the stage where the seed pods are formed.
Figure 2:
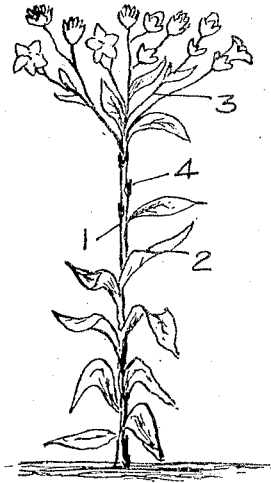
Fig. 2 is a similar view to Figure 1 showing the plant with the upper leaves adjacent the heads formed by the seed pods trimmed off.

When the plant has grown to the stage where the seed pods are formed some of the upper leaves adjacent the head 3 are trimmed off as indicated at 4 in Figure 2.

By this means the sap rising in the plant continues to nourish the lower leaves and the surplus sap passes up the stem and through the trimmed portion thereof into the head and is thereby utilized to nourish the head instead of forming suckers or shoots which grow from the stem at the base of each leaf when the head of the plant is removed in the early stages of its growth as is commonly the practice.

When the head is removed from the immature plant without trimming first as is now done the sap instead of passing into the head causes the growth of these shoots or suckers and as they grow they take the nourishment from the adjacent leaf preventing its growing to its full size and at the same time spoiling the color of the leaf.

By trimming the upper leaves off as above described and permitting the surplus sap to pass into the head this sucker growth is obviated. According to the old practice when these suckers form the whole field has to be gone over and the suckers removed by hand. When the suckers have been removed the sap for a time nourishes the leaves and permits them to grow normally until a new sucker forms when the growth of the leaf is again retarded until the whole field has been gone over and the new suckers removed. It will thus be seen that by my method this very laborious operation which has to be repeatedly performed during the growth of the plant is obviated, this operation being particularly laborious for the reason that the suckers grow all down the plant not only from the upper leaves but those adjacent to the ground.

Figure 3:
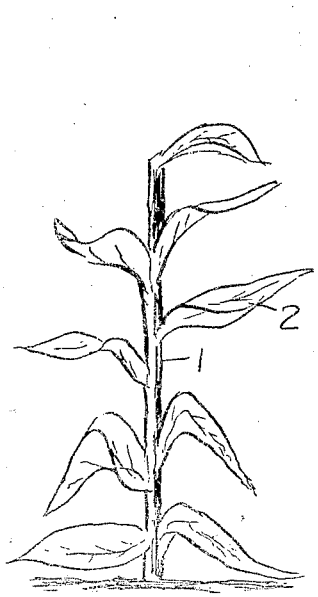
Fig. 3 is a view showing the matured plant with the head removed.
Figure 4:
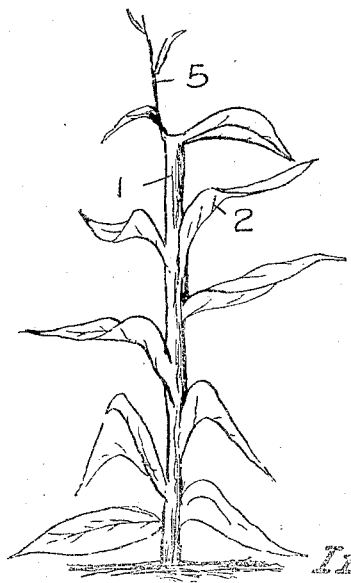
Fig. 4 is a similar view to Figure 3 showing the upper end of the stem of the plant suckering or sprouting.

After the trimming of the leaves by my method as above described the plant is then allowed to grow to maturity at which time the head is then removed as shown in Figure 3, the sap continuing to nourish the leaves of the plant and any suckers which then grow will spring from the upper end of the stem at the point where the head has been removed as indicated at 5 in Figure 4, thereby filling the stem of the plant full of sap so that it will be in a proper condition for curing.

What I claim as my invention is:

A method of growing tobacco consisting of first allowing the plant to grow until the head and seed pods are formed, then trimming off some of the upper leaves adjacent to the head whereby the surplus sap passes into the head, then allowing the plant to grow until maturity and then heading off the plant.

GEORGE HENRY MALOTT.